(12) United States Patent
Gava et al.

(10) Patent No.: US 8,752,187 B2
(45) Date of Patent: Jun. 10, 2014

(54) PORTABLE LICENSE SERVER

(75) Inventors: Fabio Gava, Ladera Ranch, CA (US); Fei Xie, Irvine, CA (US); Andrew R. Shelansky, Irvine, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 13/090,896

(22) Filed: Apr. 20, 2011

(65) Prior Publication Data

US 2012/0079601 A1 Mar. 29, 2012

Related U.S. Application Data

(60) Provisional application No. 61/386,936, filed on Sep. 27, 2010.

(51) Int. Cl.
*G06F 21/00* (2013.01)

(52) U.S. Cl.
USPC ............... 726/26; 726/27; 726/29; 713/158; 713/168; 705/51

(58) Field of Classification Search
USPC ..................................... 726/26, 29
See application file for complete search history.

(56) References Cited

U.S. PATENT DOCUMENTS

| 7,779,482 | B1 * | 8/2010 | Yen et al. .......................... 726/30 |
| 2004/0128251 | A1 * | 7/2004 | Adam et al. ...................... 705/59 |
| 2005/0239454 | A1 * | 10/2005 | Kawashima et al. ....... 455/426.1 |
| 2006/0107046 | A1 * | 5/2006 | Raley et al. .................... 713/168 |
| 2006/0154648 | A1 * | 7/2006 | Oh et al. ........................ 455/411 |
| 2006/0253545 | A1 * | 11/2006 | Lakamp ......................... 709/217 |
| 2008/0256646 | A1 * | 10/2008 | Strom et al. ..................... 726/29 |
| 2008/0271162 | A1 * | 10/2008 | Fujimura ......................... 726/29 |
| 2009/0013177 | A1 * | 1/2009 | Lee et al. ....................... 713/158 |
| 2009/0165080 | A1 * | 6/2009 | Fahn et al. ......................... 726/1 |
| 2009/0210947 | A1 * | 8/2009 | Im et al. .......................... 726/27 |
| 2010/0299522 | A1 * | 11/2010 | Khambete .................... 713/168 |

OTHER PUBLICATIONS

Flexera Software, "InstallShield 2012. Agile Development. Complex Products. App-Savvy Users." http://flereasoftware.com , 2011.

\* cited by examiner

*Primary Examiner* — Morshed Mehedi
(74) *Attorney, Agent, or Firm* — Kenneth L. Sherman, Esq.; Michael Zarrabian, Esq.; Sherman & Zarrabian LLP (57) ABSTRACT

A portable license for licensed content is obtained by a user along with a regular license in a local network, such as a home network or other private network. The portable license may be stored in a license server on a portable device, such as a smart phone or a tablet, which functions as a portable license server. The user may take the portable device to another location where it joins another local network. A device in the second network, which does not have a license to play the licensed content, may use the portable license on the portable device to execute the content, enabling the user to enjoy it in multiple environments. The device (e.g., a TV) in the second network may continue to play the content as long as the portable license or another valid license is present in the network.

31 Claims, 5 Drawing Sheets

PORTABLE LICENSE SERVER

CROSS-REFERENCE TO RELATED APPLICATIONS

This application claims priority under 35 U.S.C. §119(e) to Provisional Patent Application No. 61/386,936, filed Sep. 27, 2010 entitled "Portable License Server System," which is incorporated by reference herein in its entirety.

TECHNICAL FIELD

The present invention relates generally to computer software and digital rights management of licensed content. More specifically, it relates to content licensing schemes, networking, and portable computing devices.

BACKGROUND OF THE INVENTION

Consumers are becoming increasingly accustomed to downloading a wide variety of content from online venues, marketplaces, and content providers, onto personal and home entertainment devices. There are now many sites where users can download all types of content. As users become more familiar with downloading licensed content for which they are paying a fee, they will likely expect more convenience and flexibility from their purchases. For example, if a user downloads a movie or a video game, the user may want to watch the movie or play the game at different physical locations and not be limited to a device at home or to a few personal devices. Presently, a user is generally not able to take advantage of purchases in environments other than the one where the purchase was made. Over time, consumers will have higher expectations with respect to the content they purchased and may want to be able to play or execute the licensed content with more flexibility than is currently feasible.

Presently, there are different types of licenses available that provide various degrees of flexibility. For example, there are user-based licenses and node-lock licenses. Both these types of licenses lack the flexibility and convenience that users may expect. Floating licenses, more recently introduced, are somewhat more flexible. With floating licenses, for example, there may be 10 licenses for 50 users. One server has the license and 10 tokens which can be used by a certain number of people to execute or start the licensed content. The user essentially checks out a license token and returns it when she is done using the content. The devices that execute the content are "fixed" devices in that they do not move out of a specific network.

There are also licenses for both portable and stationary devices. However, the actual license servers are not portable. The currently available licensing schemes do not extend the convenience to the license holder to authorize a user to execute the licensed content on different devices in other networks.

SUMMARY OF THE INVENTION

General aspects of the invention include, but are not limited to methods, systems, apparatus, and computer-readable media for enabling message transmission in multimedia device networks.

One aspect of the invention is a method of executing content on a device. The content may be any type of licensed content, such as videos, movies, music, TV shows, video games, apps, e-books, and the like. First, it is determined whether a regular license for starting or playing the content on the device, such as a TV or a computer, is present on the device. It is then determined whether a portable license server is present in the local network in which the device operates. A local network may be a home network, a private network, an ad hoc network, or a peer-to-peer network, or may be defined using various characteristics, such as subnet mask, gateway, or other delimiters. A portable license for the content is obtained from the portable license server. The device verifies that the portable license was issued to the portable device from which it was received via a connection in the local network, in which the portable device is a component, although in most cases a temporary one since the portable device (e.g., a smart phone or tablet computer) can be removed from the local network by the user. The content is then executed or started on the device and the device periodically checks or polls the local network to ensure that the portable license is still present or valid and that it is authorized to continue execution of the content.

In another aspect of the invention, a licensing system based on the presence of a portable software execution device having a portable license in a local network is described. One component in the system is a license generating server having a license generator, a license database, and an originating license server. The system may also have two fixed software execution devices. A first one has a license manager for maintaining a regular license for licensed content. The second device also has a license manager that can receive and maintain a portable license for the licensed content. The portable license is transmitted to the device from a portable software execution device which has a portable license server for maintaining the portable license. The portable device is a device that is intended, in one embodiment, to be carried by a user from one location (local network) to another, and may be, for example, a smart phone, a media player, or a tablet computer. The fixed devices may be, for example, a TV or a computer.

In another aspect of the invention, a software execution device having a processor and a network interface is a described. A data storage component on the device stores a portable license server polling module for checking whether a portable license server is available on the network and if one is present, polling periodically to ensure that it is still available or valid. It also stores a portable license verification module for verifying that a portable license has been received from an authorized source and is authentic. The data storage component may also store a license manager module for managing and maintaining licenses for playing or executing various types of content. In one embodiment, the device also stores licensed content and a portable license for executing the licensed content.

In another aspect of the present invention, a portable software execution device is described having a processor and a network interface. A data storage component stores a portable license server and a portable license. In one embodiment, it also stores licensed content associated with the portable license. The device may be carried by a user in a normal or conventional manner and is operable in two or more local networks.

Another aspect of the present invention is a method of generating multiple licenses for a single licensed content. A license server receives a request for content and generates a regular or conventional license for it. It also generates a portable license for the same content. These two licenses are linked or associated and stored in a license database. The portable license and the regular license are transmitted in a single transmission to one or more software execution devices, one of which may be a portable device.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE INVENTION

Methods and systems for implementing a specialized licensing scheme are described in the various figures. A new type of licensing server may be characterized as portable in that a server module is implemented on a personal device that can be carried by a user in a conventional or normal manner from one location to another. In this sense it may also be described as nomadic; the device is not expected to be at a fixed location or to remain stationary. The portable license server module of the present invention may be implemented on a personal device that a user can carry with her and is typically used by a single user, however, the device need not be restricted to a personal device. In some cases, a few users (e.g., members of a household or co-workers) may share the device. In general, the device may be a media player (e.g., an MP3 player), a cell phone or "smart" phone, a tablet computer, a notebook computer, a laptop computer, a mobile gaming device, or other conventionally portable or nomadic device.

The portable license server may also be described as not being a conventional license manager or server often operating on a fixed device, that is, a device that is normally not carried by a user, but rather is stationary, such as a TV, a server computer, an entertainment or media center component, or a desktop computer, to name a few examples. These devices are typically not carried by a user to another location, such as a friend's house or another office. As noted above, the specialized license server of the present invention is referred to in the various embodiments as a portable license server which manages a portable license. In one intended use of the present invention, it is expected that the portable license server be carried by a user in a convenient and normal manner to other locations. As such, an implementation of the portable license server that is expected to be more practical than others is the cell phone or a personal media player (these devices generally considered the most portable and personal).

These physical characteristics of the portable device constitute one aspect that differentiates the portable license server of the present invention from a conventional license server. However, it may be noted that a conventional license manager or server may be implemented on a personal device that is portable or nomadic. From a technical standpoint, such conventional license managers need not be confined to fixed devices (TVs, servers, etc.) and their functionality does not necessarily depend on or require being implemented on a fixed or normally stationary device. Thus, besides the physical characteristics that may be attributed to a portable license server of the present invention, there are, of course, functional and operational characteristics that differentiate it in various ways from a conventional license server and accord it privileges and features not found in conventional license servers, as described below.

The functionalities and conveniences of the portable license server of the various embodiments are most fully realized and utilized when the portable device storing the portable license server is carried by a user to another location or network. In the described embodiment, the network is a local network. A local network may have various characteristics, for example, with respect to area, topology, and protocol, and, as such, may be defined in different ways. For example, a local network may be a network in a home or other type of private network, such as at a place of business (i.e., generally not accessible to the public). A local network may be defined by a subnet mask, a specific gateway, or other network characteristics and delimiters known in the art. A network may also be a peer-to-peer network, an ad hoc network, may utilize Ethernet, wireless access points (WAP), or be combinations thereof. It may also be a network where devices are connected by short-length radio waves, such as Bluetooth and other evolving technologies.

In other embodiments, the functionalities of the portable license server may, in certain specific circumstances, be implemented on a device that is not portable, i.e., that is fixed or intended to be stationary, for example, a TV or a desktop computer functioning as a home media server. Similarly, a portable license server may be implemented on a portable device, but remain at one location, essentially remaining fixed, and still carry out the functionalities of the portable license server if desired.

In the described embodiment, the portable device has a network interface and is able to connect to the Internet. However, the ability to connect to the Internet is not required for the functionalities of the portable license server. There are embodiments in which the portable device need only be able to receive and transmit data in a local or private network and that it be detectable by another device in the private network, for example, when the other device is scanning for new components in the network.

Figure 1:
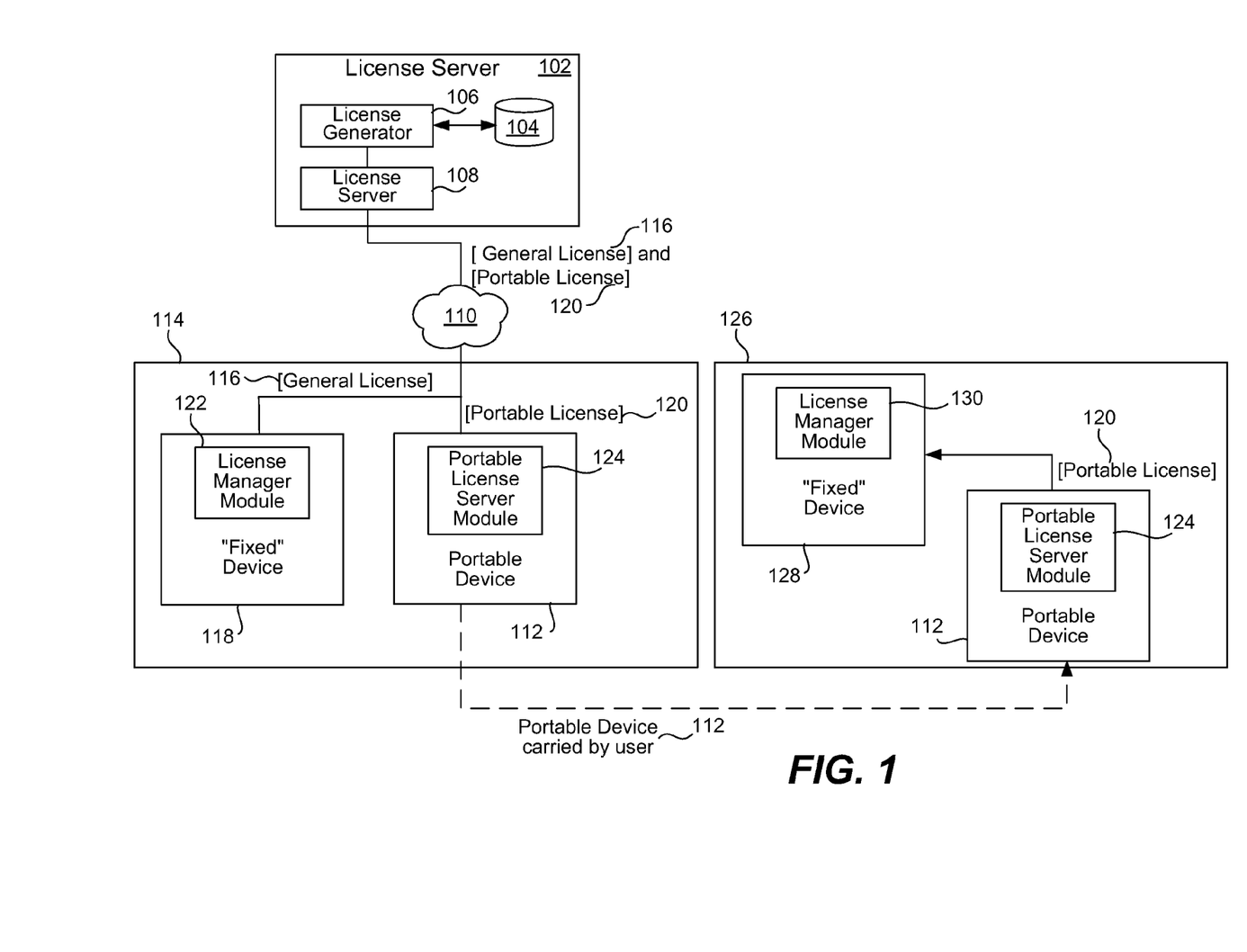
FIG. 1 is a block diagram illustrating networks, server domains and implementations of a portable license server in accordance with various embodiments.

FIG. 1 is a block diagram illustrating networks, server domains and implementations of a portable license server in accordance with various embodiments. In one embodiment, a license server 102 may have three functional modules or components: a license database 104, a license generator 106, and a license server module 108. License server 102 may be under control of a content licensor and be connected to consumers of licensed content over Internet 110 or other suitable network, such as a private network. The various types of licensed content may vary widely. Some of the more common types of content include music, music videos, motion pictures, TV and cable shows, apps, e-books, video games, and software programs and applications. Other types of applications or content may also be licensed. For example, licensed content may be described as convergence applications in that they are intended to be executed, played, or rendered on different types of platforms and devices, such as TVs and mobile phones. A convergence application may also be described as an application that can execute on multiple devices simultaneously. Some application state data may be shared among devices but information displayed on each device screen may be different. It may also be described as having components executing on more than one platform/device.

License database 104 is in communication with license generator module 106. Module 106 may be in communication with license server module 108. Alternatively, the functionalities of generator module 106 and license server module 108 may be executed by a single module which is in communication with database 104. License server 102 is normally accessible to consumers of licensed content over Internet 110 or other public network. It may also be a domain within a private network, such as one implemented in a company, government institution, educational entity, a private firm, and the like. In these scenarios, the consumers may be employees of the company, institution, etc. They may also be customers or partners who have access to the private network. The primary functions of license server 102 are to generate, manage, and distribute licenses for the content that it is responsible for.

Figure 2:
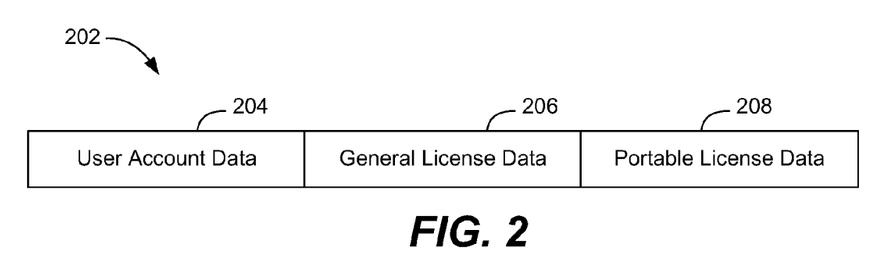
FIG. 2 is a diagram showing an example of a record in a relational license database in accordance with one embodiment.

A conventional license database normally stores data on regular licenses issued by license server 102. License database 104 of the present invention contains data on portable licenses and regular licenses. FIG. 2 is a diagram showing an example of a record in a relational license database in accordance with one embodiment. A record 202 has one or more fields 204 associated with a user account. For example, in addition to name, e-mail, contact information, account history data, it may contain data on the user's preferred or registered mobile device or data on a fixed device as explained below. Record 202 may also have one or more fields 206 that contain data on a regular license for licensed content. Fields 204 and 206 are conventional fields that may be found in a typical license database or repository.

In the described embodiment, record 202 has one or more fields 208 containing data on portable license for the licensed content. As described in detail below, a portable license, managed by a portable license server module, accords specific privileges and functionality to a device and is distinguishable from a regular license. It is worth noting that the qualifier "regular" is used here to avoid confusion and to distinguish it from the concept of the portable license. Often in the field, a "regular license," as used herein, is referred to simply as a license.

Returning to FIG. 1, in one embodiment, a user purchases licensed content using a portable device 112 in network 114 (e.g., a home network). A regular license 116 is issued to a fixed device 118 and a portable license 120 is issued to portable device 112.

In the described embodiment, the licensed content (not shown) is purchased by a user using portable device 112. In another embodiment, shown in FIG. 3, the licensed content is purchased from fixed device 118 or other device in network 114. When making the purchase, the user may specify which fixed device will store the licensed content, or license server 102 may already have this information in user account data 204. For example, database 104 may have data associating portable device 112 with fixed device 118 in home network 114 and knows that when an application is purchased from portable device 112, a regular license should be issued for fixed device 118, where it is stored locally by a license manager module 122, as described below. Portable license 120 is downloaded to portable device 112 and maintained by a portable license server module 124. The portable device 112 may come with portable license server module 124 initially installed (pre-installed) or it may be installed by the user at a later date.

Licensed content may be bought from a service provider operating a venue, such as an online app store, online retailer, market makers, content providers, or movie/TV online rental site or licensing company (e.g., ASCAP, BMI), using, as noted, portable device 112 or fixed device 118. License generator 106 uses unique information about fixed device 118 and portable device 122 to generate the licenses. For example, it may use a MAC address, a serial number, or an International Mobile Subscriber Identity (IMSI) (a unique ID associated with GSM and UMTS network mobile phones). License server module 108 operates as a front-end of database 104 to see if the fixed and portable devices are authorized to receive the licensed content.

Another network shown in FIG. 1 is network 126. As noted, this can be a home network, a network in a workplace or a network in a public space. The user takes portable device 112 to the environment implementing network 126. For example, this may be a friend's house or a co-worker's office at another location. Network 126 has the same portable device 112 (carried by the user) executing portable license server module 124. Network 126 also has a fixed device 128, such as a TV or computer, having a license manager module 130. As described below, portable license 120 is transmitted from portable device 124 to fixed device 128 via a wired or wireless connection over network 126. Fixed device 128 has license manager 130, but does not have a regular license for the licensed content, as fixed device 118 in network 114 has (i.e., license 116). Fixed device 128 may not have a connection with license server 102 in FIG. 1. Fixed device 128 may obtain the licensed content from portable device 120. In other embodiments, fixed device 128 may have a connection with license server 102. If it does have a connection, given that license management is done on license server 102, in the other embodiments, device 112 may not need to have a portable license server 124. Both fixed device 112 and portable device 112 may communicate with license server 102 to verify that device 112 has a portable license and that they are physically located in the same local network. The user of portable device 112, who has already obtained a regular license and portable license for the licensed content may want to start (e.g., execute, run, play, render, present) the licensed content, which she has paid for, on a device at a different location, namely, on fixed device 130 on network 126. Portable license 120 on portable device 112 enables her to do this.

Fixed device 128 may obtain the licensed content using one or more of options. It may be transmitted together with the portable license from portable device 112 or sent in a separate transmission from the portable device, either before or after receiving the portable license. If fixed device 128 has a connection with license server 102, it may download the content directly from the server, while still obtaining the portable license from device 112. In another embodiment, fixed device 128 may sent, from portable device 112, a pointer to a downloadable file containing the content, the file residing online (in the "cloud"), on the local network, or on any other suitable and accessible source. In another embodiment, the licensed content was previously downloaded onto fixed device 128 and is unlocked, for example by an encryption key, in the portable license. In another embodiment, there may be one or more servers that store the licensed content and the content is located and retrieved using search terms. In this scenario, the content may be found on the Internet, but without a license. When fixed device 128 then searches for a license to start the content, it may find on in its local network on portable device 112. Other means for obtaining the content and storing it on fixed device 128 may evolve and can be used while still utilizing the concept of obtaining a portable license for the content from a portable device in the fixed device's local network.

The licensed content can run on a fixed device and another device (e.g., another device in the network). There may be a chain of trust from the fixed device to the portable device because the fixed device has a regular license. A certificate in the license has a public key and a private key. If fixed device 130 (in the second network) gets portable license 120 from portable device 112, fixed device 130 trusts the certificate in the portable license because it is issued by a trusted service provider, such as the manufacturer of the fixed device (e.g., a TV manufacturer).

As is generally known in the field, when the licensed content is purchased, the content is encrypted. When the content is started, executed, played back, or run a device, it is decrypted using a key in the license. The license manager in the fixed device essentially performs the functions of a file transfer component.

Figure 3:
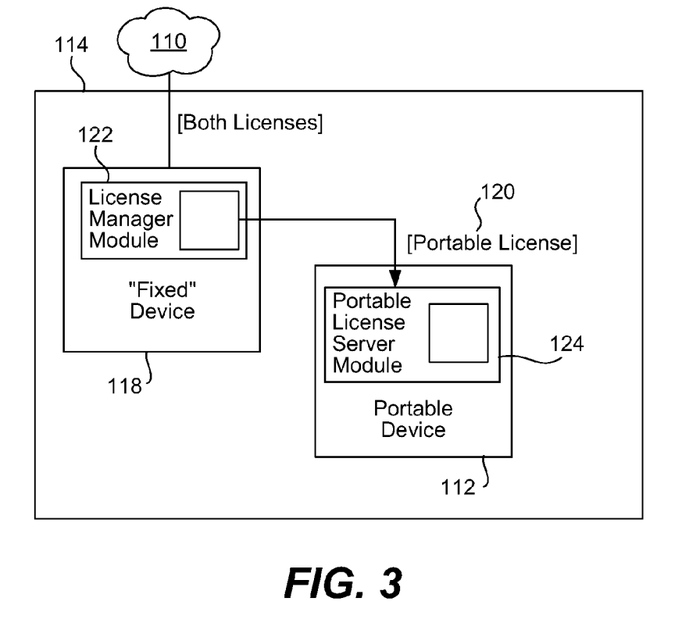
FIG. 3 is a block diagram showing network in accordance with another embodiment.

FIG. 3 is a block diagram showing network 114 in accordance with another embodiment. When the user logs into an account from fixed device 118 in network 114, such as a TV, the user gets regular license 116 for fixed device 118, but is also issued portable license 120 for a device. Portable license 120 may then be transmitted to portable device 112 and managed by module 124. Regular license 116 and portable license 120 may be installed on their respective devices at the same time or at different times. For example, portable license 120 may be installed at a later date.

Figure 4A:
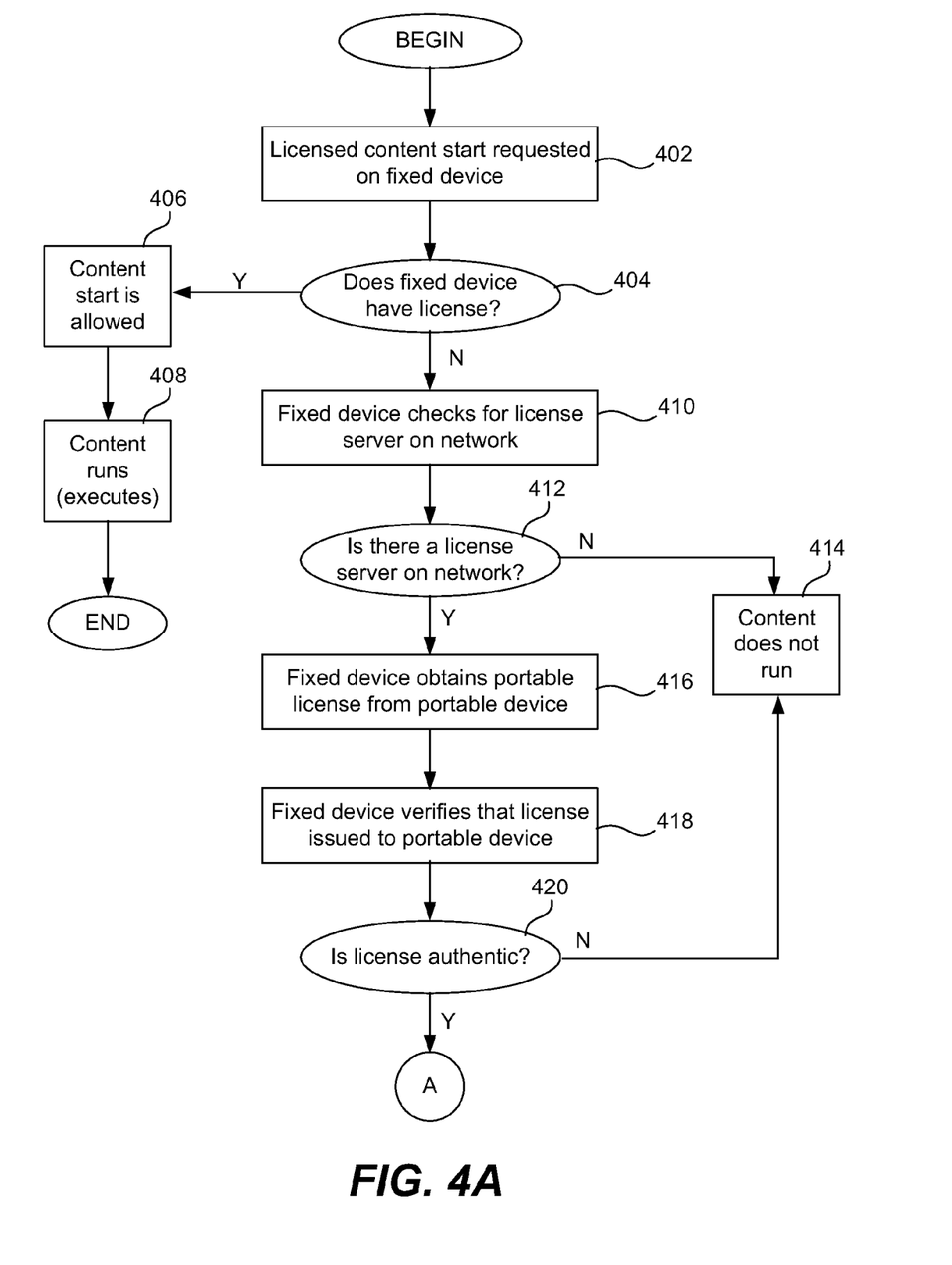
FIGS. 4A and 4B are flow diagrams of processes for implementing a portable license server in accordance with one embodiment of the present invention.
Figure 4B:
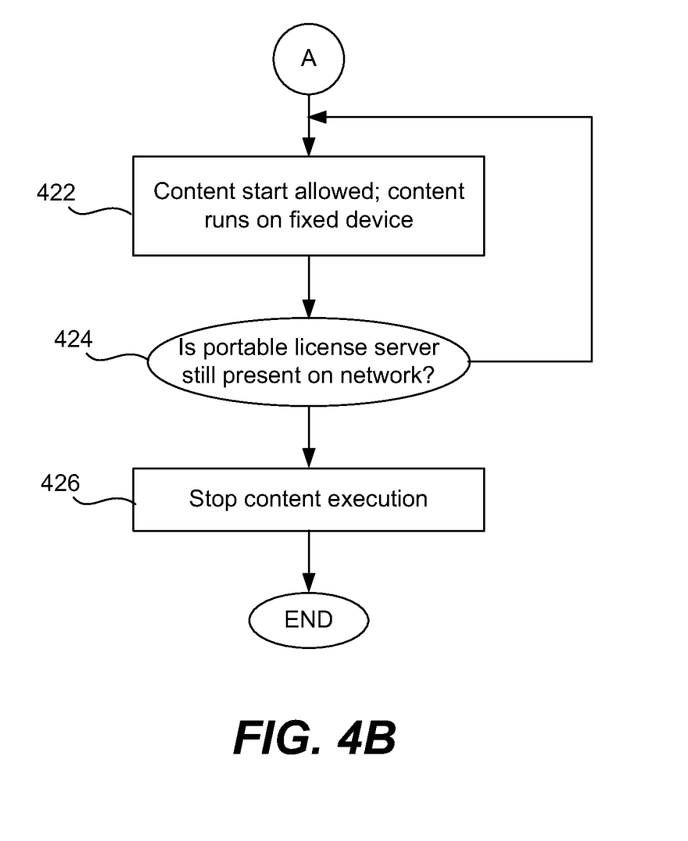

FIGS. 4A and 4B are flow diagrams of processes for implementing a portable license server in accordance with one embodiment of the present invention. A user has purchased licensed content, such as a movie or an app, and has obtained a regular license and a portable license. To better illustrate various embodiments of the portable license server process, the location of the user is not specified, that is, the process is not dependent on whether the user is in network 114 or network 126. The figures describe attempts to run the licensed content in both scenarios. At step 402, the user makes a request to start the content on a fixed device which is already powered on (e.g., pressing Play or clicking on an app). At step 404 the fixed device checks to see if it has a license to run or play the content. This operation may be performed by the license manager module on the fixed device using processes known in the field of digital rights management. If a license for the content is found on the fixed device, control goes to step 406 where the content is allowed to start (i.e., run, execute, play, etc.). The content starts or runs at step 408 and does so until it is terminated following to provisions in the license and the process is complete. This scenario (steps 402 to 408) may take place, for example, in network 114 on fixed device 118 which has a regular license to start the licensed content.

If the fixed device does not have a license (any type of license) to start the content, control goes to step 410. The fixed device is on a local network, such as a home network, and is capable of scanning the network for other devices and querying those devices. The devices on the local network may be "fixed" devices (devices that are generally always on the network) or can be devices that join the network on an ad hoc or temporary basis and can be discovered or recognized by devices already in the network, such as in an UPnP network. At step 410 the fixed device scans the other devices in the local network to see if there is a license server on the network. In one embodiment, the fixed device scans for a portable license server. If a portable license server or any suitable license server is not found, control goes to step 414 where the licensed content is not started on the fixed device and the process ends.

Returning to step 412, if there is a license server on the local network, specifically a portable license server, control goes to step 416. In the described embodiment, the fixed device sends a message to the portable device to obtain the portable license. The message to the portable device and the transmission of the portable license to the fixed device may be done through a wired or wireless connection. A suitable networking protocol, such as UPnP, may be used to implement the local network, e.g., network 126. The license manager module on the fixed device is typically responsible for requesting, obtaining, and managing the portable license (or any other type of license).

At step 418 the license manager module on the fixed device (e.g., module 130 on device 128) verifies that the license it received from the portable device is authorized to be on the portable device and, more generally, is authentic. For example, this verification would prevent someone from trying to use a portable license that was copied from one device, such as a fixed device in another network, to an unauthorized portable device. The fixed device can ensure that the portable license is from an authorized portable device. It can do this by checking a unique ID (e.g., MAC address, serial number, IMSI) in the certificate in the portable license to ensure that the license was issued to the portable device. It can check the device's unique ID and make sure it is the same. Thus, in one embodiment, the fixed device verifies conditions. The license is a valid portable license. The portable license is, in fact, issued to the device that carries it.

At step 420 the fixed device, specifically the license manager on the device, determines whether the portable license is authentic. If it is not, control goes to step 414 where the content is denied execution.

If the portable license obtained by the fixed device is authentic, control goes to step 422 where the licensed content is allowed to start and begins execution on the fixed device. The fixed device may obtain the licensed content using one of the options described above. The licensed content is allowed to run, at least initially, by virtue of the presence of the portable device having the portable license server on the network. Whether the fixed device can continue to execute the licensed content may depend on one or more factors and may be implemented in different ways. Generally, the fixed device can only execute or run the content if a valid license is present or, if taken away or expired, for a limited time thereafter.

At step 424 the license manager on the fixed device checks to see if the portable license server is still present on the network. For example, the fixed device may scan the network every n seconds or minutes to see if the portable device is still connected to the network. For example, it may poll the network for the serial number, MAC address, IMSI, or other unique identifier of the portable device. How frequently it checks the network is a design implementation choice; however, it may be preferred that the check be done frequently to know as early as possible if the initial portable license is no longer available.

In one embodiment, the fixed device checks whether the initial portable license server is still on the network. For example, the owner or user of the portable device may have left the premises (e.g., house, office). However, more generally, the fixed device does not need to find the same portable license server that initially provided the license at step 416. In order to continue executing the licensed content, the fixed device should have a valid license, which need not necessarily be the initial portable license.

In another embodiment, the portable license server sends messages which are received by the fixed device. These messages, which may be sent via unicast, multicast, or broadcast, are indications that the portable license server is still present. In this embodiment, the portable license server may be characterized as the proactive device (i.e., sending the messages) and the fixed device may be seen as the passive entity; that is, only receiving messages and not performing any type of polling. If the fixed device does not receive a message from the license server within a predetermined time period (a timeout period), then it can assume that the portable license server is no longer present on the local network. Thus, the fixed device may keep a timer to keep track of the amount of time that has passed since it last received a "present" message from the portable license server.

At step 424, the fixed device may poll for any device that has a suitable license server or is capable of performing license server functions. If it finds a device with this functionality, it may further inquire or poll to check whether the device has a license for the licensed content executing on the fixed device. If it finds that there is a suitable license (which may be a regular or portable license), it may continue execution of the licensed content and control returns to step 422.

If it does not find the initial portable license server or any other valid (replacement) license for the content, the fixed device stops execution of the licensed content at step 426. In another embodiment, if the fixed device does not find an appropriate license for the content, it may continue execution until a specific amount of time has expired, essentially letting execution of the content to time out. This may be a condition with certain types of licensed content where sudden or immediate termination would not be appropriate, for example, TV shows or movies for intended for young children. Steps 410 to step 424 describe the scenario where a user has taken the portable license server to another location (network) and is using it to start content.

In other embodiments, options may be available to continue execution of the licensed content after the portable device has left the network or to essentially switch to another license while the portable device is still present. For example, one user may have an app which he purchased for his cell phone (i.e., he obtained a licensed copy) and wants to share it with a friend. The user who purchased the app may have to leave, and his friend may want to buy his own copy of the app so that he can continue using it after his friend has left. In another example, in the home network environment, the user or owner of the portable device may be a friend with a cell phone who has bought a license for a movie at his house using his smart phone. However, he wants to watch the movie at a friend's house. He goes to his friend's house with his phone equipped with a portable license server and the portable license for the movie. At the friend's house, a home network detects the presence of the smart phone with the portable license server and, as described above, this allows them to begin watching the movie on the friend's TV (e.g., fixed device 128). Halfway through the movie, the visiting friend (the portable license holder) has to leave and must take his phone with him, but the friend he was visiting wants to continue watching the movie. In one embodiment, the visiting friend can use his smart phone to obtain another license for his friend so that the friend can continue watching the movie. This would be a separate purchase of a second license which his friend (presumably) would pay for and keep. The second license may also be a regular license and portable license package, similar to the purchase that the visiting friend made at his own home. Although, if the friend wants a portable license, it may be preferred, but not required, that he use his own portable device to make the purchase instead of the visiting friend's device.

In order to carry out this licensing transaction (to prevent the movie from stopping in the middle soon after the visiting friend leaves the house), the portable license server module on the visiting friend's smart phone may display an interface providing this option and others. Information on how to purchase additional licenses may be contained in the portable license. This information may include various data that can be used to facilitate the transaction, such as the name of the licensed content, price(s), a URL of where the license or content can be obtained (e.g., the app store or marketplace), additional description of the content, information on the author or creator of the content, discount codes, and the like. In one embodiment, this data may be included in user account fields 204 in record 202 in the license database. The licensed content provider will likely want to encourage such transactions (essentially additional purchases of a license) and implement a type of rewards program where the visiting friend is given points or rewards for being the source of or facilitating the second purchase. The interface may also give the user the option of transferring to another existing license that allows for execution of the licensed content. Thus, when the TV polls for a license, it may not find the original smart phone having the portable license server, but may find another device with a license which the TV can use to continue execution of the content.

Figure 5A:
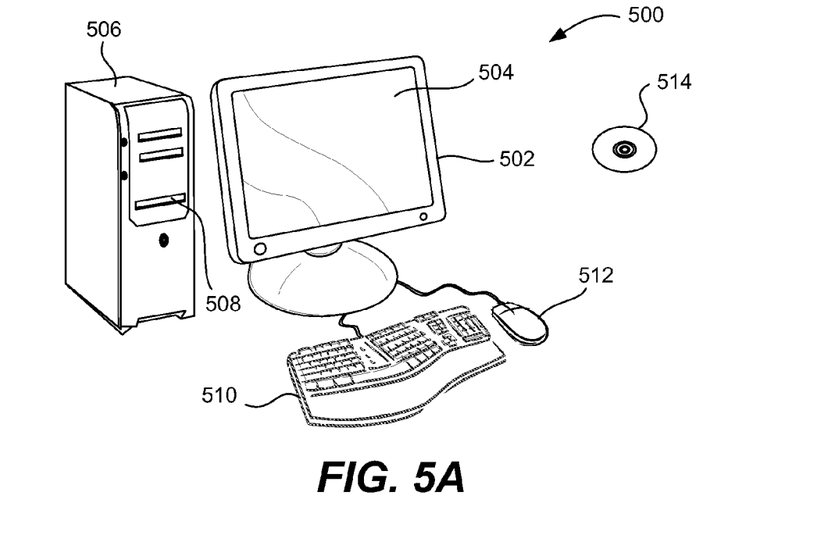
FIGS. 5A and 5B are diagrams of a computing device suitable for implementing embodiments of the present invention.
Figure 5B:
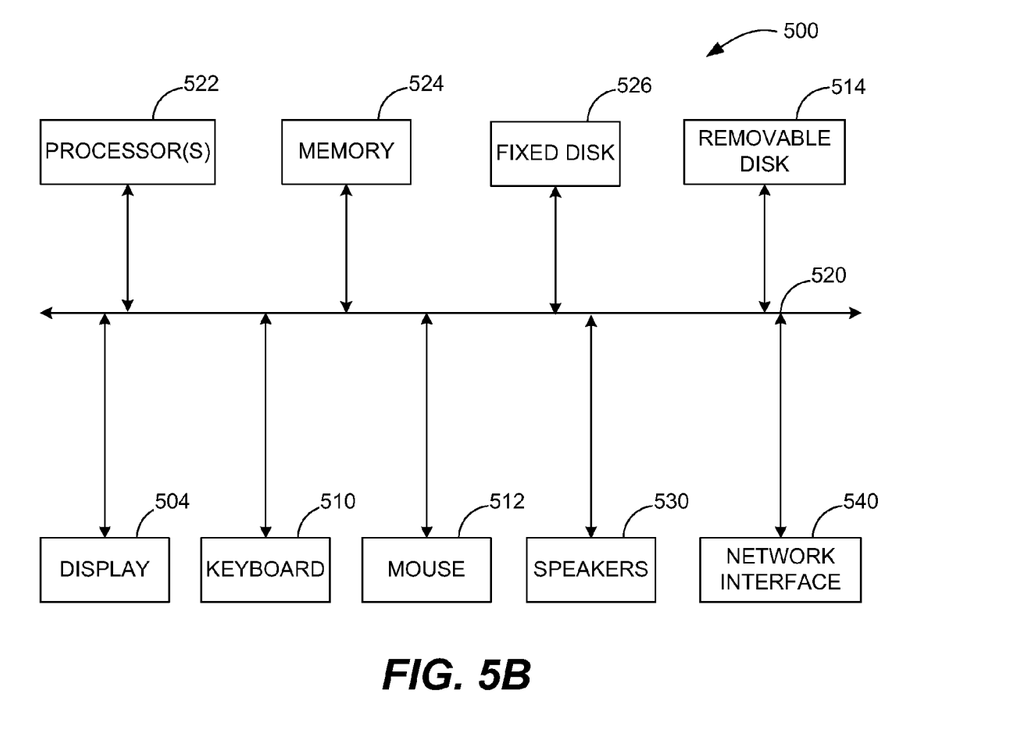

As noted above, there are various types of computing or software execution devices and systems utilized in the in the present invention, including but not limited to license servers, TVs, and mobile devices (such as cell phones, tablets, media players, and the like). FIGS. 5A and 5B illustrate a computing or software execution device 500 suitable for implementing specific embodiments of the present invention. FIG. 5A shows one possible physical implementation of a computing system. In one embodiment, system 500 includes a display 504. It may also have a keyboard 510 that is shown on display 504 or may be a physical component that is part of the device housing. It may have various ports such as HDMI, DVI, or USB ports (not shown). Computer-readable media that may be coupled to device 500 may include USB memory devices and various types of memory chips, sticks, and cards.

FIG. 5B is an example of a block diagram for computing system 500. Attached to system bus 520 is a variety of subsystems. Processor(s) 522 are coupled to storage devices including memory 524. Memory 524 may include random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 526 is also coupled bi-directionally to processor 522; it provides additional data storage capacity and may also include any of the computer-readable media described below. Fixed disk 526 may be used to store programs, data and the like and is typically a secondary storage medium that is slower than primary storage. It will be appreciated that the information retained within fixed disk 526, may, in appropriate cases, be incorporated in standard fashion as virtual memory in memory 524.

Processor 522 is also coupled to a variety of input/output devices such as display 504 and network interface 540. In general, an input/output device may be any of: video displays, keyboards, microphones, touch-sensitive displays, tablets, styluses, voice or handwriting recognizers, biometrics readers, or other devices. Processor 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon processor 522 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What we claim is:

1. A method of executing content on a device, the method comprising:
    determining whether a regular license for the content is present on the device;
    determining whether a portable license server is present in a local network;
    obtaining a portable license from the portable license server, wherein the portable license server is implemented on a portable device, and the portable license is obtained by a portable device comprising the portable license server, and the regular license is obtained by another device;
    verifying that the obtained portable license was issued to the portable device;
    executing the content; and
    determining whether the device is authorized to continue execution of the content based on:
        detecting a message from the portable license server; and
        keeping track of an amount of time that has passed after the message has been detected.

2. The method as recited in claim 1 wherein verifying that the portable license was issued to the portable device further comprises:
    comparing a verification identifier on the portable license to a portable device unique identifier.

3. The method as recited in claim 2 wherein the portable device unique identifier is one of a MAC address or an international mobile subscriber identity (IMSI).

4. The method as recited in claim 1 wherein determining whether the device is authorized to continue execution of the content further comprises:
    polling the local network to determine whether the portable license server is on the local network.

5. The method as recited in claim 4 further comprising:
    terminating execution of the content if the portable license server is not on the local network.

6. The method as recited in claim 4 further comprising:
    terminating execution of the content after a predetermined amount of time if the portable license server is not on the local network.

7. The method as recited in claim 4 further comprising:
    polling the local network for a replacement license server if the portable license server is not on the local network; and
    determining whether the replacement license server has an authorized license for the content.

8. The method as recited in claim 7 further comprising:
    terminating execution of the content if the replacement license server does not have an authorized license.

9. The method as recited in claim 1 wherein two or more components on the local network execute the content at the same time using the portable license.

10. The method as recited in claim 1 wherein two or more components on the local network execute the content at the same time using the portable license and wherein one or more components on a second local network executes the content using a regular license.

11. The method as recited in claim 1 wherein the local network is a network having a plurality of nodes that is limited to a specific subnet mask.

12. The method as recited in claim 1 wherein the local network is a network having a plurality of nodes that is limited to a specific gateway.

13. The method as recited in claim 1 wherein the local network is a home network.

14. The method as recited in claim 1 wherein the local network is a private network.

15. The method as recited in claim 1 wherein the local network is a peer-to-peer network.

16. The method as recited in claim 1 wherein the portable license server manages one or more portable licenses.

17. The method as recited in claim 1 wherein executing the content includes one of playing media that requires a license, executing an application that requires a license, executing a software application that requires a license, playing a video game that requires a license, or rendering e-book content that requires a license.

18. The method as recited in claim 1 wherein the portable device is a personal device that is intended to be mobile and is carried by a user.

19. The method as recited in claim 1 wherein the regular license and the portable license for the content are obtained simultaneously based on a purchase of a licensed content.

20. The method as recited in claim 1 wherein the portable device presents an option for obtaining a regular license or an additional portable license for the content.

21. The method as recited in claim 20 wherein information on how the device may obtain a regular license or an additional portable license is included in the portable license.

22. The method as recited in claim 19 wherein a reward is offered to a user account associated with the portable device if a regular license or an additional portable license is obtained by the device.

23. The method as recited in claim 1 wherein the device is a fixed device and comprises a television or a computer.

24. The method as recited in claim 1 wherein the device does not have a network connection to a source from where the content was obtained or from where the regular license or the portable license was obtained.

25. The method of claim 1, wherein the portable device comprises a mobile device.

26. A system comprising:
a fixed device; and
a mobile device including a portable license server;
wherein the fixed device obtains a portable license from the portable license server for executing content in a local network, and the portable license is obtained by the mobile device, and a regular license is associated with the portable license;
wherein the fixed device is authorized to continue execution of the content based on location of the portable license server,
wherein the fixed device determines whether it is authorized to continue execution of the content based on:
detecting a message from the portable license server; and
keeping track of an amount of time that has passed after the message has been detected.

27. The system of claim 26, wherein the fixed device verifies that the portable license received from the portable license server is authentic and authorized for the mobile device.

28. The system of claim 26, wherein the portable license and the regular license are distinguishable.

29. The system of claim 28, wherein the portable license and the regular license have different privileges and functionality.

30. The method of claim 1, wherein the portable license and the regular license are obtained from another license server.

31. The method of claim 30, wherein the portable license and the regular license are stored on a same record in a database of the other license server.

* * * * *